Figure 3:
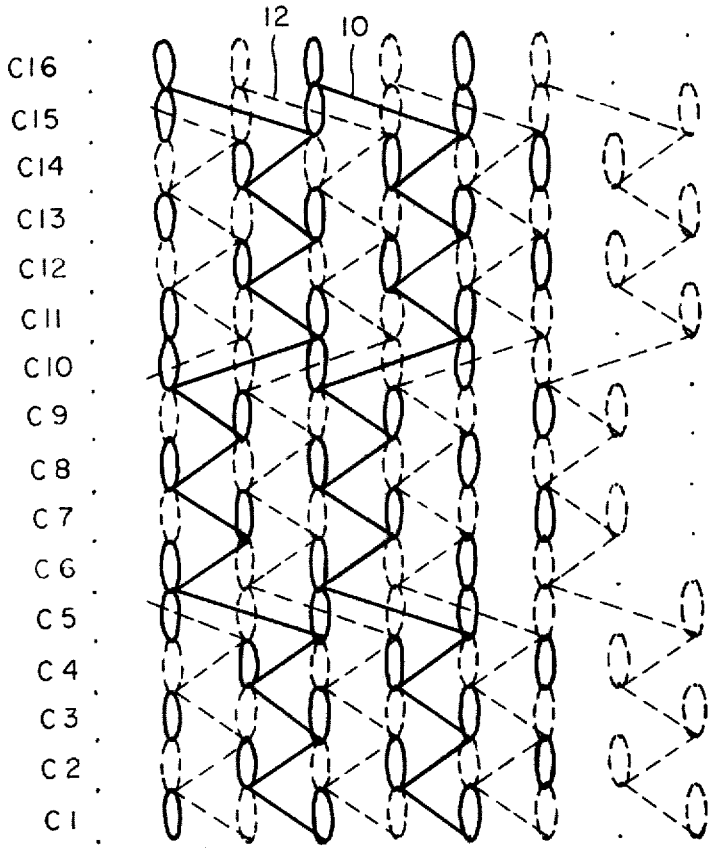

United States Defensive Publication [19] (H) [11] T953,009

Neuhaus [43] Dec. 7, 1976

[54] WARP KNIT PRODUCT AND THE PROCESS OF MAKING SAME

[76] Inventor: Heinz Neuhaus, 19 Winburne Drive, New Castle, Del. 19720

[21] Appl. No.: 677,989

[22] Filed: Apr. 19, 1976

[51] Int. Cl.[2] ..... D04B 21/00

[52] U.S. Cl. ..... 66/195

[57] ABSTRACT

A warp knit two-way stretch fabric is provided by knitting three yarns into two interconnected grids of loops, one grid being of a first inelastic yarn alternating coursewise with elastic yarn to provide a repeat pattern of a plurality of interconnected loops of elastic yarn in alternate wales of the fabric and in the same sets of successive courses and a plurality of interconnected loops of inelastic yarn in intervening wales of the fabric, and the other grid being of a second inelastic yarn. The fabric is preferably made by alternate threading of the first inelastic yarn and the elastic yarn on the back guide bar of the knitting machine and the second inelastic yarn on the front guide bar. The back guide bar performs an underlap of at least two needles at least once in every nine courses in the fabric and the front guide bar moves in opposition to the back guide bar. The interconnected loops of elastic yarn occur when the back guide bar places a yarn loop from one end of elastic yarn of one course directly over a yarn loop from another end of elastic yarn of a preceding course. This placement also forms the interconnected loops of first inelastic yarn.

9 Claims, 2 Sheets Drawing,

11 Pages Specification

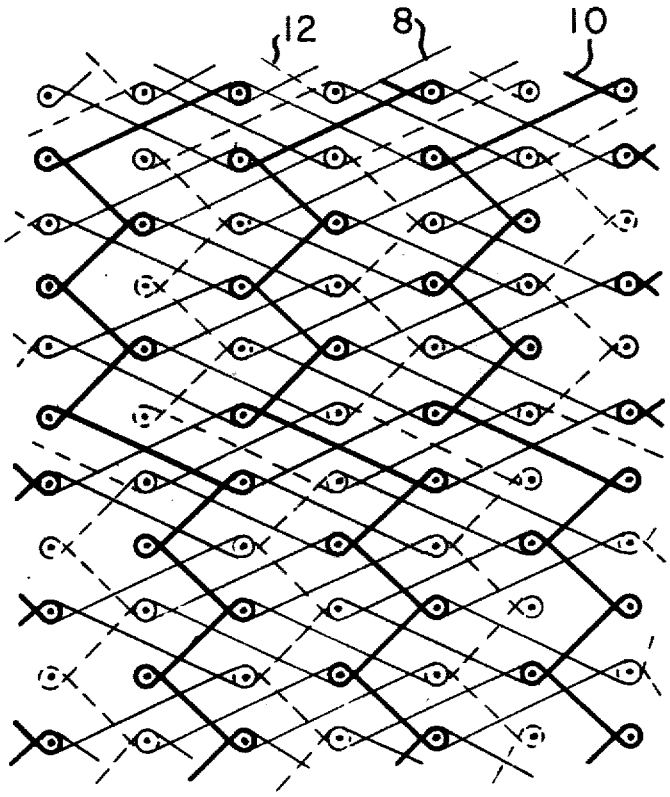

FIG. 1
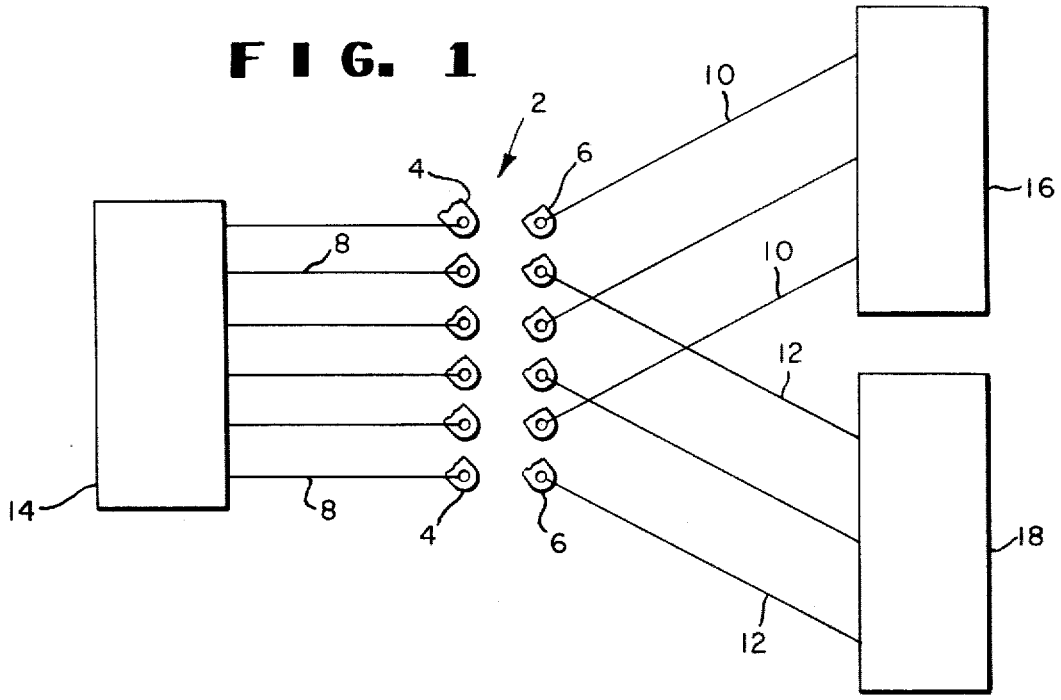
FIG. 2A
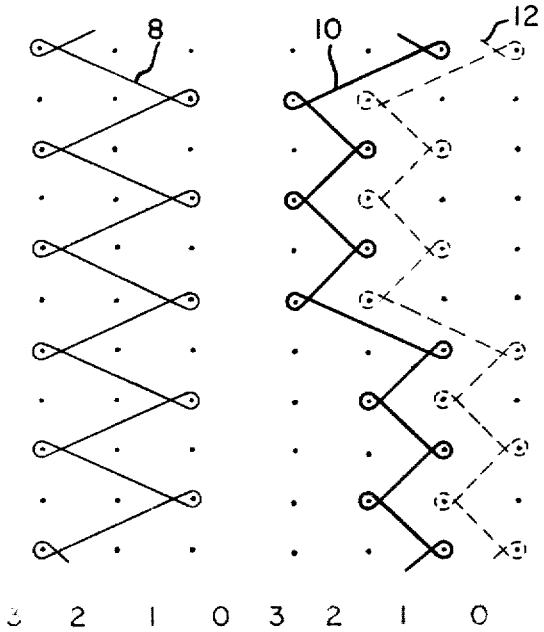
FIG. 2B
FIG. 2C
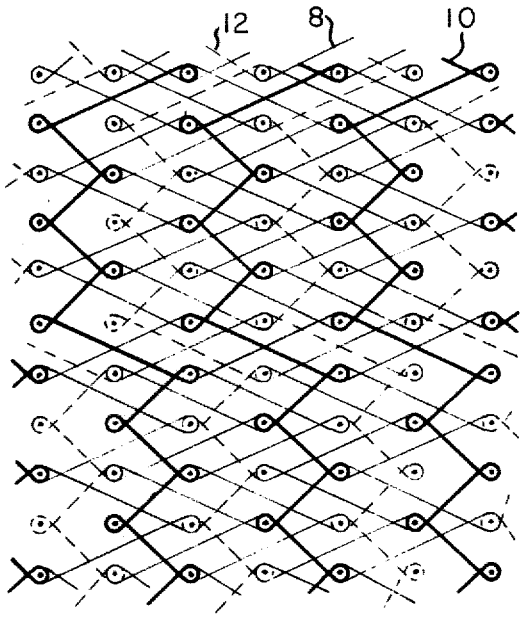

The file of this unexamined application may be inspected and copies thereof may be purchased (849 O.G. 1221, Apr. 9, 1968).